US007079636B1

United States Patent
McNitt et al.

(10) Patent No.: US 7,079,636 B1
(45) Date of Patent: Jul. 18, 2006

(54) THREE-WAY TELEPHONE CALL PREVENTION SYSTEM AND METHOD

(75) Inventors: George McNitt, Keller, TX (US); Michael Lord, Corpus Christi, TX (US)

(73) Assignee: Evercom Systems, Inc., Dallas, TX (US)

(*) Notice: Subject to any disclaimer, the term of this patent is extended or adjusted under 35 U.S.C. 154(b) by 657 days.

(21) Appl. No.: 10/252,956

(22) Filed: Sep. 20, 2002

Related U.S. Application Data

(60) Provisional application No. 60/324,227, filed on Sep. 21, 2001.

(51) Int. Cl.
*H04M 3/00* (2006.01)

(52) U.S. Cl. ............. 379/189; 379/200; 379/207.01
(58) Field of Classification Search ............ 379/189, 379/200, 207.01, 215.01
See application file for complete search history.

(56) References Cited

U.S. PATENT DOCUMENTS

| 4,993,062 A | 2/1991 | Dula et al. |
| 5,319,702 A | 6/1994 | Kitchin et al. |
| 5,539,812 A | 7/1996 | Kitchin et al. |
| 5,768,355 A | 6/1998 | Salibrici et al. |
| 5,796,811 A | 8/1998 | McFarlen |
| 5,805,685 A | 9/1998 | McFarlen |
| 5,926,533 A | 7/1999 | Gainsboro |
| 6,141,406 A * | 10/2000 | Johnson ............ 379/189 |
| 6,665,376 B1 * | 12/2003 | Brown ............ 379/85 |

OTHER PUBLICATIONS

U.S. Appl. No. 60/324,227, Lord.

* cited by examiner

*Primary Examiner*—Bing Q. Bui
(74) *Attorney, Agent, or Firm*—Fulbright & Jaworski LLP

(57) ABSTRACT

Discloses are systems and methods for detecting undesired call activity. Preferred embodiment systems and methods comprise detecting a call signal level, determining if the call signal level is below a predetermined silence level threshold, and measuring a duration the call signal level remains below the predetermined silence level threshold.

21 Claims, 2 Drawing Sheets

THREE-WAY TELEPHONE CALL PREVENTION SYSTEM AND METHOD

RELATED APPLICATIONS

The present invention is related to, and hereby claims priority to, co-pending U.S. provisional patent application Ser. No. 60/324,227 entitled "Three-Way Telephone Call Prevention System and Method," filed Sep. 21, 2001, the disclosure of which is hereby incorporated herein by reference.

TECHNICAL FIELD

The invention relates to the field of telecommunications and in particular to the field of systems and methods for preventing the placement of three-way telephone calls.

BACKGROUND OF THE INVENTION

Private premise-based telephone systems, such as those installed at correctional facilities, have created a need to monitor various events occurring on the telephone lines of the system. Telephone systems at correctional facilities may comprise a microprocessor-based call processing system having operational software that is capable of allowing control over telephones connected to the system. For example, the system may be programmed to prevent inmates from contacting unauthorized parties or using the telephone system for fraudulent purposes. An authorization mechanism may be utilized to prevent inmates from dialing unauthorized numbers directly.

A particular problem that is encountered with these systems is the placement of a three-way call by a party that is authorized to be called by the inmate. Once the inmate is connected to an authorized number, the inmate may be connected to a third party at an unauthorized number via the three-way call feature.

A three way call is initiated when the originally called party (an authorized party outside the private telephone system) depresses the hook switch on the telephone, generating a hook flash signal. This signals the telephone central office to put the inmate on hold and provide a dial tone to the originally called party. On receipt of the dial tone, the originally-called party dials the number of an unauthorized third party, and when the connection is completed, the inmate and the unauthorized third party can communicate through the connection established outside the private system.

Conventional three-way call monitoring systems rely on the detection of telephone signals. They typically monitor the local telephone connection for the hook flash "click" signal or associated central office signals that fall in a frequency band outside the range of signal frequencies produced by the human voice. These systems typically monitor signals on the local telephone line through a frequency filter designed to pass audio signals in this frequency band. A three way call attempt is indicated whenever signals in the frequency band have energies above a selected threshold. Some systems even compare the signals with a hook flash reference signal utilizing sampling techniques implemented with a digital signal processor (DSP).

All of these systems are not very accurate for a number of reasons. The underlying assumptions about the frequency profile of three way call events, i.e. the hook flash and signals generated by activating central office switches, are often wrong. For example, the hook flash signals are often modified by transmission through switches and along loaded lines, and even if assumptions about the frequency characteristics of the initial signal are accurate, these characteristics may be substantially distorted by the time the "hook flash" signal reaches the three way call detection system.

SUMMARY OF THE INVENTION

The present invention provides systems and methods for detecting particular calling activity, even when instigated at the called party terminal, such as to prevent the placement of three-way telephone calls. Preferred embodiments of the present invention monitor a call signal level to determine periods of "silence" for a determination with respect to the occurrence of undesired call activity. Accordingly, the pitfalls associated with prior systems monitoring for hook flash signal attributes can be avoided or supplemented by avoiding the necessity to detect signals associated with hook flash events.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

A system for preventing three-way telephone calls based on a silence duration monitoring technique is set forth herein. Unlike prior systems, the system of the present invention measures the duration that the communications line (com line) signal level falls below a predetermined low signal level (silence threshold or maximum silence level). Any signal level that falls below the silence threshold is considered silence. When a caller is placed on hold during placement of a three-way call, the signals on a corn line will be characterized by some low level signals associated with noise on the line. Hence, a silence threshold is defined to accommodate these signals. For example, a silence threshold may be defined to be −56 dB according to a preferred embodiment.

Figure 1:
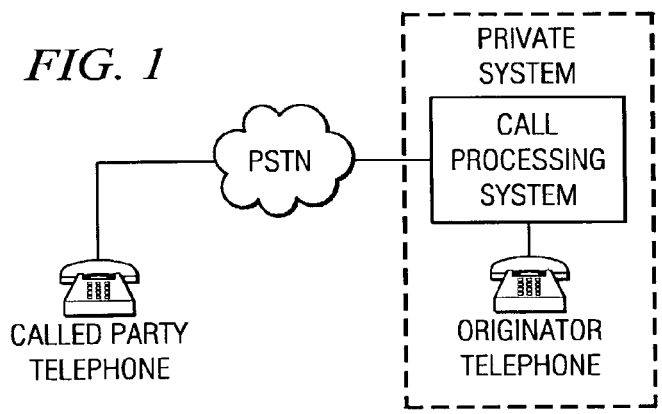
FIG. 1 is a block diagram depicting a call originator telephone within a private telephone system having a call processing system that is in communication with a called party telephone via the Public Switched Telephone Network (PSTN)

FIG. 1 is a block diagram that illustrates the physical domain of a three-way call prevention system that is integrated into a call processor in a private telephone system.

In accordance with a preferred embodiment of the present invention, an analog-to-digital converter (AD Converter) converts an analog signal from the corn line, such as the corn line associated with the originator and called party telephones, and the resulting digital signal is processed by a digital signal processor(DSP). The DSP essentially creates a digital representation of the amplitude level of the signal on the corn line. Thus, the DSP allows the signal amplitude to be numerically analyzed, as opposed to analysis of other electrical characteristics of the signal, such as waveforms, peak detection, frequency, etc.

Figure 2:
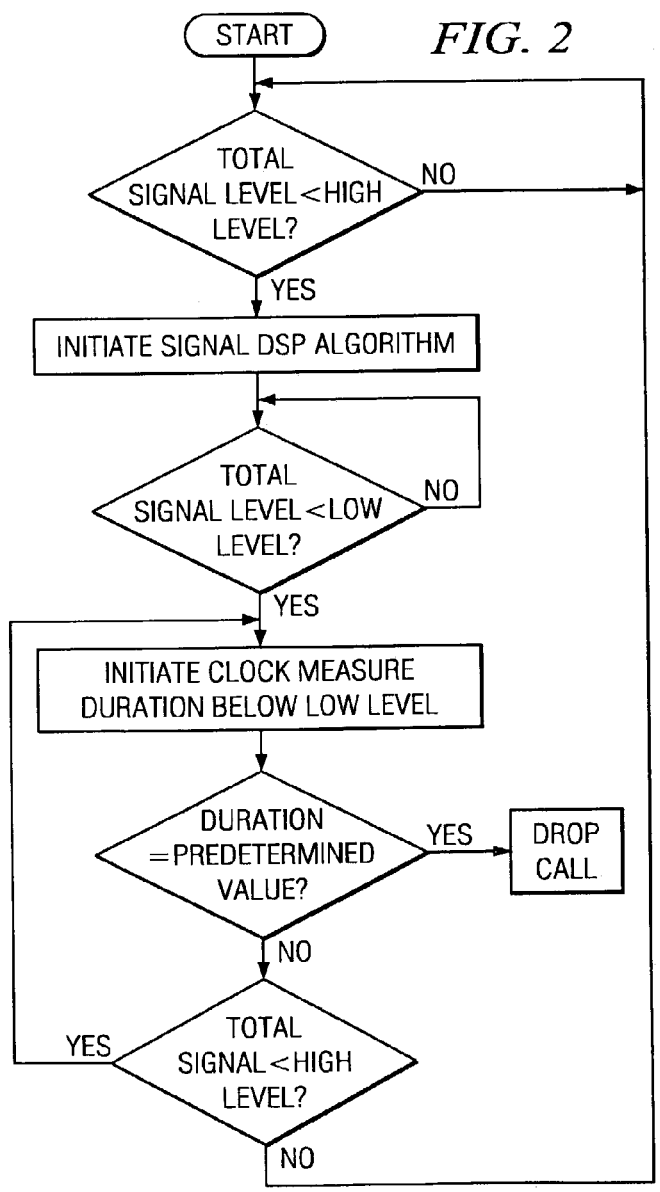
FIG. 2 is a flow chart of the silence monitoring algorithm of the three-way call prevention system of the present invention.

FIG. 2 is a flow chart of the silence monitoring DSP algorithm of the three-way call prevention system of a preferred embodiment of the present invention. The DSP software is used to specify a predetermined high signal level (e.g., minimum conversation level) and low signal level (silence threshold or maximum silence level). According to a preferred embodiment of the present invention a minimum conversation level is established to be −53 dB and a maximum silence level is established to be −56 dB. However, it should be appreciated that other values may be selected, such as based upon line conditions, calling systems utilized, etcetera.

During a phone call, when the total signal level drops below the high signal level, the system preferably initiates a signal "listening" algorithm associated with the DSP to determine if the total signal level drops below the silence threshold. The DSP continues to "listen" to the signal level to determine if it drops below the silence threshold. Only when the signal level drops below the silence threshold will the system begin to measure the duration of time the signal remains below the level of silence. If the duration reaches a predetermined value, such as 13,000 milliseconds, the call may be dropped or otherwise handled according to system design. On the other hand, if the signal level increases above the silence level before the duration value is reached, the clock (which measures the duration of time) is preferably reset and the monitoring algorithm continues. If the signal level increases above the high signal level at any time, this preferably suspends the algorithm. By defining an algorithm suspension or reset at the high signal level threshold, the system can efficiently conserve system resources, such as memory, as well as simplify software requirements.

In addition to monitoring the duration of the signal level dropping below the silence threshold for a minimum predetermined time, embodiments of the present invention may also measure the duration of time the signal remains below the level of silence for a maximum predetermined value, such as 16,000 milliseconds. Accordingly, a silence "window" may be established in which the termination of signal "silence" must occur for a determination that an undesired calling activity is taking place. Such a window may be utilized, and perhaps adjusted empirically, to prevent false detection of undesired calling activity.

The system can be implemented utilizing a wide range of hardware and/or software platforms by one skilled in the software, computer, and/or electrical arts. This three-way call prevention system is preferably implemented as a software function routine integrated into a microprocessor-based call processing system that includes interface hardware having at least one DSP component. A network interface board, such as one available in the Alliance Generation® family of full-function digital signal processing (DSP) resource and network interface boards available through NMS Communications, can be utilized.

Figure 3:
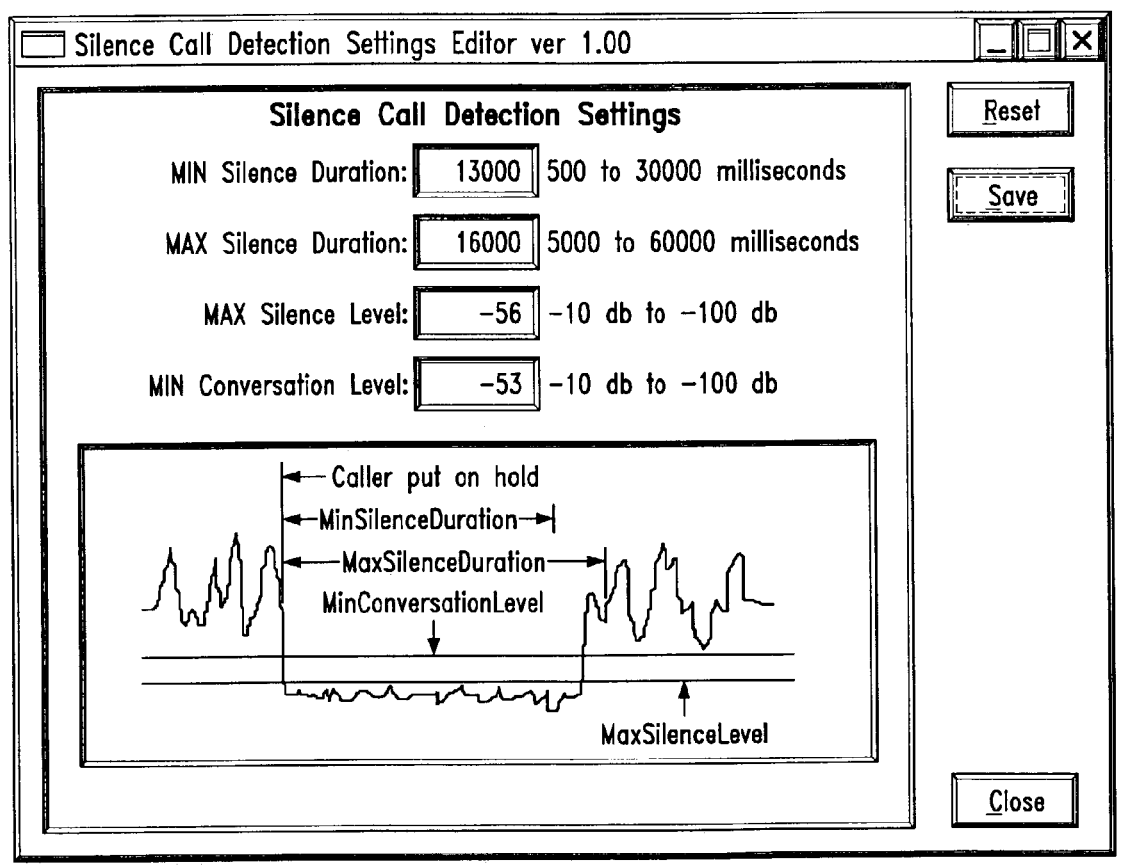
FIG. 3 is a screen shot of software for controlling call detection according to the present invention.

Directing attention to FIG. 3, a screen shot of software for controlling call detection according to the present invention is shown. Specifically, the screen shot of FIG. 3 shows user configurable parameters for selecting a silence window for detection of three-way calling being established as a minimum silence duration of 13,000 milliseconds and a maximum silence duration of 16,000 milliseconds. Similarly, the screen shot of FIG. 3 shows user configurable parameters for selecting a maximum silence level of −56 dB for determining when "silence" is occurring and a minimum conversation level of −53 dB for invoking silence measuring.

According to the embodiment of FIG. 3, the two duration parameters define the outside limits of silence. In example, the screen shot shows 13,000 milliseconds (i.e., 13 seconds) and 16,000 milliseconds (i.e., 16 seconds). Qualifying silence for a determination of undesired call activity should last for more than (or equal to) 13 seconds and less than (or equal to) 16 seconds. If the silence period lasts 12 or less seconds or more than 16 seconds, there is no qualifying silence event.

The two signal levels are preferably measuring amplitude (i.e., volume). One is the decibel (dB)/amplitude level of the conversation floor, and the other is the silence ceiling.

It should be appreciated that there is generally a specific amount of time spent by the called-party establishing a three-way call. These two outside duration parameters can be set to the upper and lower duration limits required to establish a three-way call. That, coupled with the two decibel (dB)/amplitude levels, should provide adequate tools for detecting a Three-way Call.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for detecting undesired call activity, said system comprising:
   means for detecting a call signal level;
   means for determining if said call signal level is below a predetermined silence level threshold; and means for measuring a duration said call signal level remains below said predetermined silence level threshold.

2. The system of claim 1, further comprising:
means for determining if said measured duration said call signal level remains below said predetermined silence level threshold exceeds a minimum silence duration.

3. The system of claim 2, wherein said minimum silence duration is operator selectable.

4. The system of claim 2, wherein said minimum silence duration is approximately 13,000 milliseconds.

5. The system of claim 2, further comprising:
means for determining if said measured duration said call signal level remains below said predetermined silence level threshold exceeds a maximum silence duration.

6. The system of claim 5, wherein said maximum silence duration is operator selectable.

7. The system of claim 5, wherein said maximum silence duration is approximately 16,000 milliseconds.

8. The system of claim 1, wherein said predetermined silence level threshold is operator selectable.

9. The system of claim 1, wherein said predetermined silence level threshold is approximately −56 dB.

10. The system of claim 1, further comprising:
means for determining if said call signal level is below a predetermined high level threshold, wherein said means for determining if said call signal level is below a predetermined silence level threshold and said means for measuring a duration said call signal level remains below said predetermined silence level threshold are operable under control of said means for determining if said call signal level is below said predetermined high level threshold.

11. The system of claim 10, wherein said predetermined high level threshold comprises a minimum conversation level threshold.

12. The system of claim 11, wherein said minimum conversation level threshold is approximately −53 dB and said predetermined silence level threshold is approximately −56 dB.

13. A method for detecting undesired call activity, said method comprising:
detecting a call signal level;
determining if said call signal level is below a predetermined silence level threshold; and
measuring a duration said call signal level remains below said predetermined silence level threshold.

14. The method of claim 13, further comprising:
determining if said measured duration said call signal level remains below said predetermined silence level threshold exceeds a minimum silence duration.

15. The method of claim 14, wherein said minimum silence duration is operator selectable.

16. The method of claim 14, further comprising:
determining if said measured duration said call signal level remains below said predetermined silence level threshold exceeds a maximum silence duration.

17. The method of claim 13, wherein said predetermined silence level threshold is approximately −56 dB.

18. The method of claim 13, further comprising:
determining if said call signal level is below a predetermined high level threshold, wherein said determining if said call signal level is below a predetermined silence level threshold and said measuring a duration said call signal level remains below said predetermined silence level threshold are operable upon said determining said call signal level is below said predetermined high level threshold.

19. The method of claim 18, wherein said predetermined high level threshold comprises a minimum conversation level threshold.

20. The method of claim 19, wherein said minimum conversation level threshold is approximately −53 dB and said predetermined silence level threshold is approximately −56 dB.

21. A method for detecting undesired call activity, said method comprising:
specifying a predetermined high signal level and a predetermined low signal level;
determining, without detecting a signal associated with a hook flash, when a call signal level drops below said high signal level;
initiating a signal listening algorithm to determine if said call signal level drops below said low signal level;
measuring a duration of time said call signal remains below said low signal level; and
determining if said duration reaches a predetermined value, indicating said undesired call activity.

* * * * *